US005855516A

United States Patent [19]

Eiba

[11] Patent Number: 5,855,516

[45] Date of Patent: Jan. 5, 1999

[54] METHOD AND SYSTEM FOR AUTOMATIC RUNNING OF TOURNAMENTS

[75] Inventor: Peter Eiba, Königsbrunn, Germany

[73] Assignee: Weh GmbH, Eerbindungstechnik, Illertissen, Germany

[21] Appl. No.: 687,506

[22] PCT Filed: Jan. 27, 1995

[86] PCT No.: PCT/EP95/00296

§ 371 Date: Jul. 29, 1996

§ 102(e) Date: Jul. 29, 1996

[87] PCT Pub. No.: WO95/20795

PCT Pub. Date: Aug. 3, 1995

[30] Foreign Application Priority Data

Jan. 27, 1994 [DE] Germany .......................... 44 02 419.3

[51] Int. Cl.[6] .............................. A63F 9/22; G06F 17/00

[52] U.S. Cl. ......................... 463/42; 273/371; 364/410.1; 364/411.1

[58] Field of Search .................................. 463/1, 29, 30, 463/40, 41, 42, 43; 364/410, 411, 410.1, 411.1; 340/323 R; 273/371–376, 401, 408, DIG. 26

[56] References Cited

U.S. PATENT DOCUMENTS

| | | | |
|---|---|---|---|
| 4,237,376 | 12/1980 | Giacomotti et al. . | |
| 4,268,744 | 5/1981 | McGeary et al. . | |
| 4,319,131 | 3/1982 | McGreary et al. . | |
| 4,367,526 | 1/1983 | McGreary et al. . | |
| 4,575,622 | 3/1986 | Pellegrini . | |
| 4,709,136 | 11/1987 | Watanabe . | |
| 4,764,666 | 8/1988 | Bergeron | 463/29 |
| 4,815,741 | 3/1989 | Small . | |
| 4,918,603 | 4/1990 | Hughes et al. . | |
| 5,083,271 | 1/1992 | Thacher et al. | 364/410 |
| 5,114,155 | 5/1992 | Tillery et al. | 463/42 |
| 5,179,517 | 1/1993 | Sarbin et al. | 463/29 |
| 5,265,874 | 11/1993 | Dickinson et al. | 463/29 |
| 5,359,510 | 10/1994 | Sabaliauskas | 364/410 |
| 5,637,844 | 6/1997 | Eiba . | |

FOREIGN PATENT DOCUMENTS

| | | |
|---|---|---|
| 290 073 | 5/1991 | German Dem. Rep. . |
| 28 54 229 | 7/1980 | Germany . |
| 33 29 847 | 2/1985 | Germany . |
| 4222896 | 1/1994 | Germany . |
| 44 02 419.3 | 8/1994 | Germany . |

*Primary Examiner*—Jessica J. Harrison
*Assistant Examiner*—Mark A. Sager
*Attorney, Agent, or Firm*—Knobbe, Martens, Olson & Bear, LLP

[57] ABSTRACT

A method and system for assuring the smooth, rapid execution and automatic control of a tournament. Participants' names are announced, and the participants notified to take their turn in the tournament by means of one or more electronic displays accessible to a number of potential participants. Personal identity data corresponding to the participants are entered, up to a given number of participants, based on the particular tournament variant via a data reading unit linked to each display. The groups of participants are arranged in order using a random access technique. Upon completion of each match, the winner is announced, and the groups of participants are organized for succeeding rounds. The tournament continues until completion, when the results are analyzed by the system and displayed.

10 Claims, 2 Drawing Sheets

METHOD AND SYSTEM FOR AUTOMATIC RUNNING OF TOURNAMENTS

FIELD OF THE INVENTION

A method of organizing players in an automatically run contest.

BACKGROUND OF THE INVENTION

Such a system and a method are known from DE 4 222 896. In this system a data carrier which includes participant and control data is introduced into one or more reading devices, these data are accepted by a computing unit and the pairings for the first tournament round are determined therefrom. These pairings are then displayed on the display device and the current match is played. After conclusion of the match, the participant data carriers are introduced to the reading devices in a predetermined sequence, for example, winner first, and the tournament results are determined therefrom under control of the computing unit. The individual phases of running the tournament are strictly determined by the sequence of the data carriers introduced at the time into the reading devices, so that the persons otherwise necessary to run the tournament as tournament of game leaders are superfluous. Since the input of the necessary information is moreover effected with the aid of machine readable data carriers and no keyboard data input is therefore provided, input errors are avoided and any kind of manipulation is ruled out.

In this method, before beginning a tournament and after switching on the apparatus, the desired system card is first inserted into the slot of the reader, so that the computer can accept the program corresponding to the desired tournament, for example, KO system, double KO system. Likewise, different variants of the course of the match or tournament can be entered with such a system card. Although this method has basically proved its worth, at the beginning of a tournament it is necessary to settle between the game participants, which tournament and match variant is to be selected by the system card. This needs the agreement of the game participants in order that the match or tournament variant desired by all game participants can be selected by means of the system card. This system card is, however, frequently not at hand, e.g., it is misplaced, so that the tournament cannot begin or can only begin after a delay. In addition, discussion about the presently desired match variant often leads to dispute, so that a game leader must once again decide which variant is to be selected. Moreover, in tournaments with a large number of game participants, all game participants are frequently not present when determining the match variant of the tournament, so that delays can occur from this.

As a consequence, the invention is based on the object of developing a method and a system according to DE 4 222 896 so that the beginning of the tournament can largely be run automated, so that a friction-free, more rapid running of tournaments results.

SUMMARY OF THE INVENTION

The present invention provides a method for automatic running of tournaments, including the steps of announcing a tournament variant and calling up the tournament participants on one or more display devices accessible to a plurality of potential game participants within a predetermined interval of time, and inputting personal identification data associated with the respective game participants on a data reading device coupled to the display device up to a particular number of game participants based on the tournament variant. The method further includes grouping the game participants randomly, running the game with a corresponding automatic determination of winners of each round, sorting the next groupings of participants for the next round, and terminating the game with an analysis of the tournament rounds. The method further comprises printng the determined tournament results. Further, in the method, the game participant who first enters his identification data is made the tournament leader, who can terminate the course of the tournament by renewed input of his identification data.

In particular, by the announcement and the calling up of tournament participants on an electronic display device within a predetermined interval of time, the potential match participants can "put down their names" for the current tournament by entering personal identification data. Through this it is possible for the particular individual person to be told about the current match or tournament variant on the display device before "putting down his name" and then to decide whether they want to participate also in the current match or tournament variant. As soon as the number of game participants provided for the current tournament has been reached, the drawing of lots for the game participant groupings is automatically started. It is also possible through this for a plurality of players to reserve for a certain match variant and then only on attaining the provided number of game participants for the individual players to be called out. In particular with supra-local tournaments, an announcement of a match variant can thereby be made each time, so that players living at a distance can also participate in the tournament. This is especially advantageous for electronic darts games, for example, when, for example, playing groups each with four players at eight different places wish to participate in a large tournament with 32 players. The calling up or the announcement of a certain match variant (e.g., in an electronic darts game) is preferably effected in this by a central computer, which sends out the corresponding announcement over a network, especially the public telephone network, to the connected units. The participants can thereby have access to such a unit with an electronic display device, to register their interest in participation in the current announced game. Depending on the interest of the potential game participants, a tournament can thus be put together after a few seconds or minutes and thus begin without delay.

BRIEF DESCRIPTION OF THE DRAWINGS

Further features and advantages of the system and method according to the invention appear from the following description of an embodiment, with reference to the drawings, in which.

DESCRIPTION OF THE PREFERRED EMBODIMENTS

Figure 1:
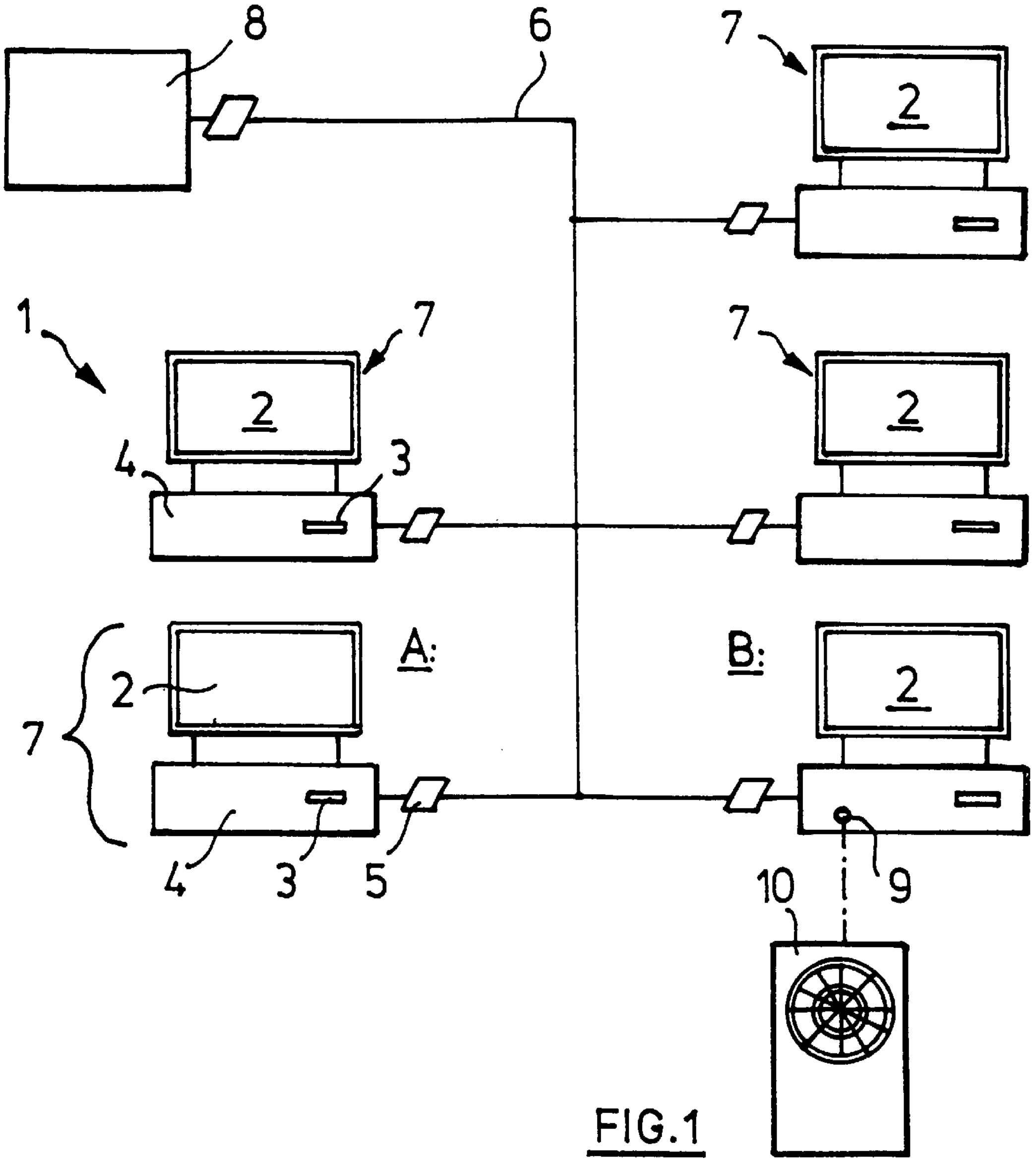
FIG. 1 shows the basic system structure for carrying out the method.

The basic structure of the system for automatic running of tournaments is shown in FIG. 1. A system 1 comprises at least one (preferably more, however) display device 2 for announcing a current tournament variant. As well as calling up the tournament participants, there can also be shown on the display device 2 a guide on the running of the tournament for the information of interested participants, as well as, for example, a ranking list of the last played tournament. On the basis of this information, the game participant can decide whether he will take part in the currently announced tournament. In order to "put down his name" for this tournament, he can enter his personal identification data on a data reading device 3 coupled to the display device 2, in particular by inserting a smart card. His personal identification data is thereby read into a data processing device 4, which is also coupled to the display device 2 and updates the current "entrant data" and the number of interested potential game participants. This data for beginning the tournament can be transmitted over a data transmission network to all connected display devices 2, for example, by means respective modem interfaces 5 feeding into the telephone network 6, so that further game participants are also connected "on-line" and can ascertain the current entry status to the tournament, as well as likewise being able to enter the tournament by inserting a smart card.

The display device 2, the data reading device 3 and the data processing device 4 are in the preferred manner in the form of a PC computer, while the display can be a conventional VDU and the data reading device 3 is formed, for example, by a smart card reader, which is fitted in place of a diskette or hard disk drive. The units 7 thus formed can also be connected over the network 6 to a central computer 8, which coordinates the plurality of units 7 coupled thereto and controls their display devices 2.

Figure 2:
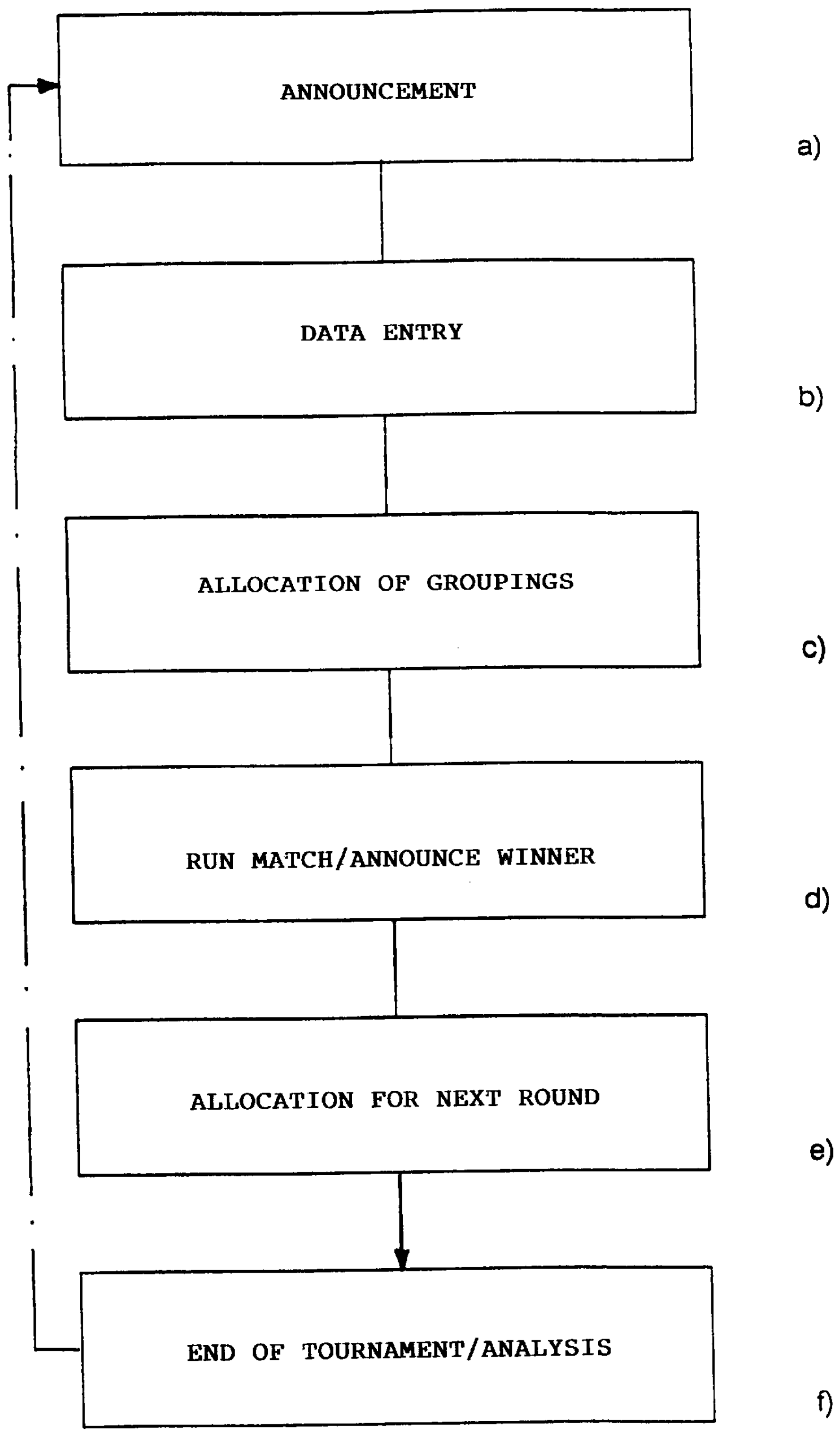
FIG. 2 is a flow chart showing the individual method steps.

The basic flow chart for the automatic running of the tournament is shown in FIG. 2. As indicated above, in method step a) an announcement of a tournament to be arranged is displayed on an electronic display device 2 within a predetermined interval of time, this display device 2 being accessible by a plurality of potential game participants. After completed "putting down of names" in the shape of method step b)="data entry", the entry to the tournament is completed in a short time, in particular when a predetermined number of participants is reached. The individual groupings or the pairings of the game participants playing against one another are then allocated, especially by the random principle. After running the current match, the winner in electronic games, for example, the known video games, is announced directly on a respective unit 7. Then in step e) the allocation of the groupings for the next round is made, for example, on the KO system, through eighth finals, quarter finals, semi-finals through to the final game. In the concluding step f) the tournament is analyzed and if desired a new ranking list is determined. After conclusion of the tournament the next tournament game is announced again in method step a). Depending on the loading of the network 6 however, a next tournament can already be announced concurrently to the nonparticipating units 7, while one tournament game is still running. If the announcement does not encounter sufficient interest within a predetermined interval of time, the next match variant, for example, stored in the central computer 8, is announced, so that a change in the course of the tournament is provided each time.

As indicated above, this method and the corresponding system are especially suited to electronic games, for example, for so-called joystick-controlled video games, which are connected through an interface 9 to the data processing device 4 of each unit 7 (cf. FIG. 1). However, a schematically indicated electronic darts game can also be provided as the games apparatus 10, on which the visitors to a games arcade at site A can, for example, play on one unit 7 each against the visitors to a restaurant at site B, as is indicated in the lower part of FIG. 1. Thus, a plurality of potential game participants can thus be addressed through the networking over the telephone network 6 and can participate in the game variant X currently offered and announced on the display device 2, depending on kind of game or playing strength. If, for example, a game variant X is announced for which the players at site A are competitive with the players at site B, the two parties to the tournament can "pre-book" tournament participation by inserting corresponding smart cards. The machine readable data carrier which is inserted in the data reading device 3 is preferably in the form of a smart card or magnetic strip card. This data carrier comprises personal identification data, so that the respective opponents can be recognized and a person-related ranking list can be established. This applies especially to so-called club cards, which a potential games player can purchase, in order to be able to participate in the game system with a number of potential game participants.

I claim:

1. A method for automatic running of tournaments, comprising the steps of:

announcing and calling up tournament participants on one or more electronic display device(s) accessible to said tournament participants;

inputting personal identification data associated with the tournament participants up to a predetermined number of the tournament participants on a data reading device coupled to the display device;

randomly allocating groupings of the tournament participants for competition in at least one round of the tournament;

running the tournament with an automatic determination of winners of each round of the tournament;

allocating winners of each round to participant groupings of tournament rounds up to a final round; and terminating the tournament with an analysis of tournament results that are automatically generated, wherein a tournament participant who first enters a personal identification data is made a tournament leader and the tournament is terminated by a subsequent input of the identification data of the tournament leader.

2. A method according to claim 1, wherein the tournament results are displayed on the electronic display device.

3. A method according to claim 1, wherein the tournament results are printed.

4. A method according to claim 1, wherein the step of inputting the personal identification data is effected by inserting a smart card in the data reading device.

5. A system, comprising:

at least one display device for announcing and calling up tournament participants, said display device being accessible to said tournament participants;

at least one data reading device coupled to the display device for entry of identification data by the tournament participants up to a predetermined number of tournament participants; and at least one data processing device for allocating tournament participant groupings, for running the tournament with an automatic determination of winners of each round of the tournament, for allocating determined winners to the tournament participant groupings of a next round up to a final round, and for terminating the tournament with an automatically generated analysis of tournament results, wherein a tournament participant who first enters a personal identification data is made a tournament leader and the tournament is terminated by a subsequent input of the identification data of the tournament leader.

6. A system according to claim 5, wherein at least one interface is provided in the data processing device for connection of electronic games apparatuses.

7. A system according to claim 5, wherein the display device, the data reading device and the data processing device are coupled together in a personal computer.

8. A system according to claim 7, wherein a plurality of units are provided and are connected by means of a modem to a telephone network.

9. A system according to claim 8, wherein a central computer is provided to control the plurality of units and analyze the tournament results.

10. A method for automatic running of tournaments, comprising the steps of:

announcing and calling up tournament participants on one or more electronic display device(s) accessible to said tournament participants;

inputting personal identification data associated with the tournament participants up to a predetermined number of the tournament participants on a data reading device coupled to the display device, which device is accessed by at least one tournament participant to input data for that participant;

randomly allocating groupings of the tournament participants for competition in at least one round of the tournament after the input of said personal identification data by said at least one participant;

running the tournament with an automatic determination of winners of each round of the tournament;

allocating winners of each round to participant groupings of tournament rounds up to a final round; and terminating the tournament with an analysis of tournament results that are automatically generated.

* * * * *

UNITED STATES PATENT AND TRADEMARK OFFICE

CERTIFICATE OF CORRECTION

PATENT NO. : 5,855,516
DATED : January 5, 1999
INVENTOR(S) : Peter Eiba

It is certified that error appears in the above-identified patent and that said Letters Patent is hereby corrected as shown below:

Title page,
Item [73], Assignee: should be deleted.

Signed and Sealed this

Thirty-first Day of July, 2001

*Attest:*

Nicholas P. Godici

NICHOLAS P. GODICI
*Acting Director of the United States Patent and Trademark Office*

*Attesting Officer*